United States Patent [19]

Stanwick

[11] 4,345,433
[45] * Aug. 24, 1982

[54] TRAPPED AIR METHOD OF GENERATING ROTARY POWER IN A DEEPSEA ENVIRONMENT

[76] Inventor: Tad Stanwick, 4715 Upton St., NW., Washington, D.C. 20016

[*] Notice: The portion of the term of this patent subsequent to Aug. 5, 1997, has been disclaimed.

[21] Appl. No.: 108,725

[22] Filed: Dec. 31, 1979

Related U.S. Application Data

[63] Continuation-in-part of Ser. No. 907,062, May 17, 1978, Pat. No. 4,215,544.

[51] Int. Cl.³ .............................................. F03B 13/10
[52] U.S. Cl. ........................................ 60/327; 60/398
[58] Field of Search ................... 60/329, 398, 327; 175/5, 6; 405/191; 114/337, 293; 137/590, 589, 587

[56] References Cited

U.S. PATENT DOCUMENTS

| | | |
|---|---|---|
| 1,098,203 | 5/1914 | Williams ................................ 137/590 |
| 2,176,477 | 10/1939 | Varney et al. . |
| 3,163,985 | 1/1955 | Bouyoucos . |
| 3,435,846 | 4/1969 | Horton et al. ....................... 137/590 |
| 3,436,914 | 4/1969 | Rosfelder . |
| 3,504,648 | 4/1970 | Kriedt . |
| 3,595,012 | 7/1971 | Beck, Jr. . |
| 3,670,680 | 6/1972 | Kriedt .................................. 60/398 |
| 3,903,696 | 9/1975 | Carman ................................ 60/414 |
| 4,181,455 | 1/1980 | Stanwick ........................ 114/293 X |
| 4,211,077 | 7/1980 | Cassidy ................................ 60/398 |
| 4,215,544 | 8/1980 | Stanwick ............................. 60/398 |

*Primary Examiner*—Irwin C. Cohen
*Attorney, Agent, or Firm*—David H. Semmes

[57] ABSTRACT

Trapped air method of generating turbine or rotary power within a deepsea environment. Rotary turbine power is generated by admitting water through a submerged turbine and into a trapped air sphere, so as to compress the trapped air. As the sphere fills with water, the compressed air assists in bleeding of the admitted water from the sphere via a flexible conduit extending to a point above the sea surface.

3 Claims, 2 Drawing Figures

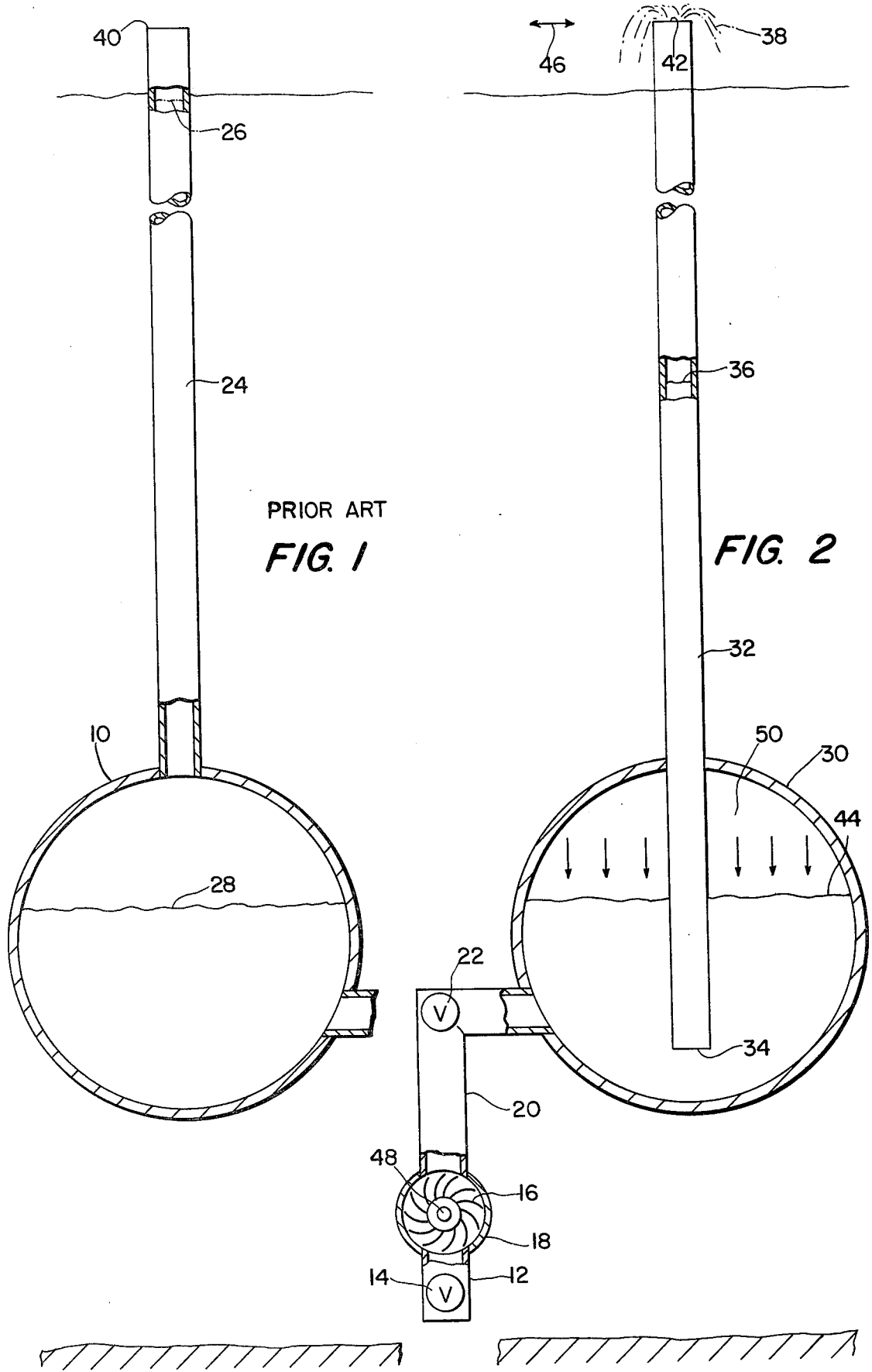

TRAPPED AIR METHOD OF GENERATING ROTARY POWER IN A DEEPSEA ENVIRONMENT

CROSS REFERENCES TO RELATED APPLICATIONS

A continuation-in-part of applicant's METHOD OF GENERATING ROTARY POWER IN A DEEPSEA ENVIRONMENT (Serial No. 907,062), filed May 17, 1978 and issued as U.S. Pat. No. 4,215,544.

BACKGROUND OF THE INVENTION

Field of the Invention

Generating rotary power in the deepsea environment, for example, 1,000 fathoms or greater, particularly developing torque or rotary power by admitting ambient sea water through a rotary turbine and into a trapped air sphere, while bleeding admitted water to a surface location. As the level of admitted water rises within the sphere, the compressed air assists in bleeding of admitted water to the surface.

SUMMARY OF THE INVENTION

According to the present invention, rotary power is generated in the deepsea environment by supporting a rotatable turbine and sphere containing trapped air in communicat relationshship, submerging the turbine and trapped air sphere to a deepsea working depth, admitting water at the deepsea working depth through the turbine and into the trapped air sphere, so as to drive the turbine and compress the trapped air, then bleeding admitted water from a lower portion of the sphere to a surface location.

The bleeding of admitted water may be via a flexible conduit, such as a telephone cable with core removed and extending to a point above or adjacent the surface location.

The present invention is distinguished from the parent invention in the placement of the flexible conduit such that its lower end extends from the lower portion of the sphere, beneath the admitted water level within the sphere, to a point above the surface location. This arrangement permits compression of the trapped air, as water is admitted into the sphere, such that the compressive forces assist in bleeding water through the flexible conduit to a point above the surface location.

DESCRIPTION OF THE DRAWINGS

FIG. 1 is a schematic drawing showing prior art evaluated sphere 10 for developing underwater power as in the parent application.

FIG. 2 is a schematic drawing showing trapped air sphere 30 for generating rotary power, according to the present trapped air method.

DESCRIPTION OF THE PREFERRED EMBODIMENTS

In FIG. 1 there is illustrated for comparison purposes prior art evacuated sphere 10, operable according to the invention defined in the parent application. In FIG. 2 there is illustrated trapped air sphere 30, operable according to the present trapped air method.

With respect to FIG. 2 there is illustrated an intake manifold 12, having inlet valve 14 controlled from a surface location and proximate a rotary turbine 16 suitably mounted upon transverse shaft 48 within housing 18. Shaft 48 may be extended in a manner (not illustrated) for attachment to a rotary drill, seabed augur or other power equipment. For example, a conduit connection 20 is supported in communicant relationship with turbine housing 18 and trapped air sphere 30. A directional flow valve 22, controlled from a surface location, may be employed to divert admitted water to the trapped air sphere 30.

The prior art evacuated sphere 10 may include a flexible conduit 24 extending from the top of sphere 10, above rising water level 28, to the ocean surface and terminating as at 40 such that the water being bled from sphere 10 rises to its own level 26 at the ocean surface. As indicated in the parent application, water may be pumped from surface 26 upwardly to a research vessel or the like (not illustrated), so as to assure continuous flow or bleeding through conduit 24 and, thus, continuous operation of turbine 16.

According to the present invention, water admitted into trapped air sphere 30, increasingly compresses the trapped air. So long as the pressure of admitted water exceeds the pressure of the trapped air, the water level, 44 rises both within sphere 30 and conduit 32. Since the trapped air maintains a pressure differential within the sphere, the trapped air assists in bleeding admitted water through intake 34 positioned in the lower part of sphere 30 and flexible conduit 32, thereby, raising the level 36 of water within the conduit.

It is estimated that prior to filling of the sphere 30 with admitted water, the water in conduit 32 in seeking its own level, might rise to a level 36 intermediate sphere 30 and the ocean surface. As the trapped air is compressed, the compressed trapped air will assist bleed-off, such that the water level will rise from intermediate level 36 to a point 46 above the surface. Consequently, the water being bled overflows as at 38 around the conduit upper discharge end 42.

This work cycle will cease eventually, as the trapped air within the top of sphere 30 is compressed to a point of absorption within the admitted water. Accordingly, as the trapped air is absorbed and the pressure differential subsides, the overflow level 46 of the water will reside to sea level.

Manifestly, the ambient pressure of water entering through valve 14 at a depth of 20,000 feet would be approximately 10,000 pounds per square inch. Assuming that equal amounts of water were admitted through valve 22 both to the evacuated sphere 10 and trapped air sphere 30 the water level in sphere 10 would rise, as the sphere fills, through the top of sphere 10 and through conduit 24, to a point 26 at the ocean surface. In admitting equal amounts of sea water into evacuated sphere 10 trapped air sphere 30, the water level in evacuated sphere 10 would be that level indicated by 28. The water level in trapped air sphere 30, however, would be that indicated by 44 in the sphere and also at level 36 in the conduit.

The water level 44 in trapped air sphere 30 would rise more gradually as the trapped air is compressed and, simultaneously, water would be bled through conduit 32 to an intermediate level 36. As the compressed pressure of the trapped air exceeds the volumetric pressure of admitted water, the trapped air assists in bleed-off, forcing flow to a point 46 above sea level. In this overflowing mode trapped air sphere 30 would be almost filled with water level 44, rising to the top of sphere 30. The height or level of overflow above sea level will depend, of course, upon the working depth and the concomitant degree of compression of the trapped air.

The continuous flow through housing 18, sphere 30 and conduit 32 generates power which may be utilized via shaft 48 for driving a seabed augur or other power equipment.

Manifestly, the structure of the flexible conduit, sphere and turbine components may be varied without departing from the spirit of invention.

I claim:

1. Trapped air method of generating deepsea rotary power comprising:
   A. supporting a rotatable turbine and sphere containing trapped air in communicant relationship;
   B. submerging said turbine and sphere containing trapped air to a deepsea working depth;
   C. admitting water at the working depth through said turbine and into said sphere containing trapped air, so as to drive said turbine and compress the trapped air; and
   D. bleeding admitted water with an assist from the trapped air from a lower portion of said sphere to a surface location via a flexible conduit extending from the bottom of said sphere to a point adjacent the surface location.

2. Trapped air method of generating deepsea rotary power as in claim 1, wherein said working depth is adjacent the seabed, such that rotation of said turbine develops rotary power adjacent the seabed.

3. Method of generating deepsea rotary power as in claim 2, wherein said bleeding is via a flexible conduit extending from the bottom of said sphere to a point above the surface location.

* * * * *